(12) United States Patent
Amram Summit et al.

(10) Patent No.: US 7,298,119 B1
(45) Date of Patent: Nov. 20, 2007

(54) STEP-UP/STEP-DOWN (BUCK/BOOST) SWITCHING REGULATOR CONTROL METHODS

(75) Inventors: Jeffrey Lewis Amram Summit, Jefferson, MA (US); Brett A. Miwa, Wellesley, MA (US); Karl Richard Volk, Scotts Valley, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 175 days.

(21) Appl. No.: 11/145,269

(22) Filed: Jun. 3, 2005

(51) Int. Cl.
*G05F 3/16* (2006.01)
(52) U.S. Cl. .................. 323/225; 323/284; 323/285
(58) Field of Classification Search ............... 323/222, 323/224, 225, 282, 283, 284, 285, 286
See application file for complete search history.

(56) References Cited

U.S. PATENT DOCUMENTS 6,087,816 A    7/2000  Volk
6,166,527 A *  12/2000 Dwelley et al. ............ 323/222
6,275,016 B1   8/2001  Ivanov
6,831,448 B2 * 12/2004 Ishii et al. .................. 323/282
2006/0055384 A1* 3/2006 Jordan et al. ............... 323/282

* cited by examiner

*Primary Examiner*—Jessica Han
(74) *Attorney, Agent, or Firm*—Blakely, Sokoloff, Taylor & Zafman LLP (57) ABSTRACT

A step-up/step-down switching regulator control method for a regulator having an inductor with first and second leads, a first switch for controllably coupling the first lead to a source of power, a first device between the first lead and a circuit ground, a second switch for controllably coupling the second lead to the circuit ground, and a second device between the second lead and a regulator, the method comprising operating the switches in a sequence of phases when the source of power has a voltage exceeding the regulator output and in the same sequence of phases when the source of power has a voltage less than the regulator output, the phases being phase 1 with the first and second switches closed, phase 2 with the first switch closed and the second switch open, and phase 3 with both switches open. The first and second devices may be switches or diodes. Various embodiments are disclosed.

34 Claims, 9 Drawing Sheets

STEP-UP/STEP-DOWN (BUCK/BOOST) SWITCHING REGULATOR CONTROL METHODS

BACKGROUND OF THE INVENTION

1. Field of the Invention

The present invention relates to the field of step-up/step-down switching regulators.

2. Prior Art

Step-up/step-down switching regulators use pulse width modulation techniques to control the transfer of energy from a power source to a load. When the voltage ranges of the power source and the load overlap, a common condition in battery powered portable equipment, this control function becomes more complicated. Existing techniques exhibit such undesirable behaviors as frequency subharmonics, increased voltage and current ripple, mode hunting, reduced conversion efficiency and increased component stress. By way of example, an H-bridge circuit such as that shown in FIG. 1 can be used as a buck-boost DC to DC converter. Such a converter and method of operation of such a converter is disclosed in U.S. Pat. No. 6,087,816. This system has a large current ripple. The inductor, capacitors and power switches must be rated at a much larger current than the load current.

BRIEF DESCRIPTION OF THE DRAWINGS

FIG. 12 is a more complete state diagram for the embodiment of FIG. 4a.

DETAILED DESCRIPTION OF THE PREFERRED EMBODIMENTS

Figure 2:
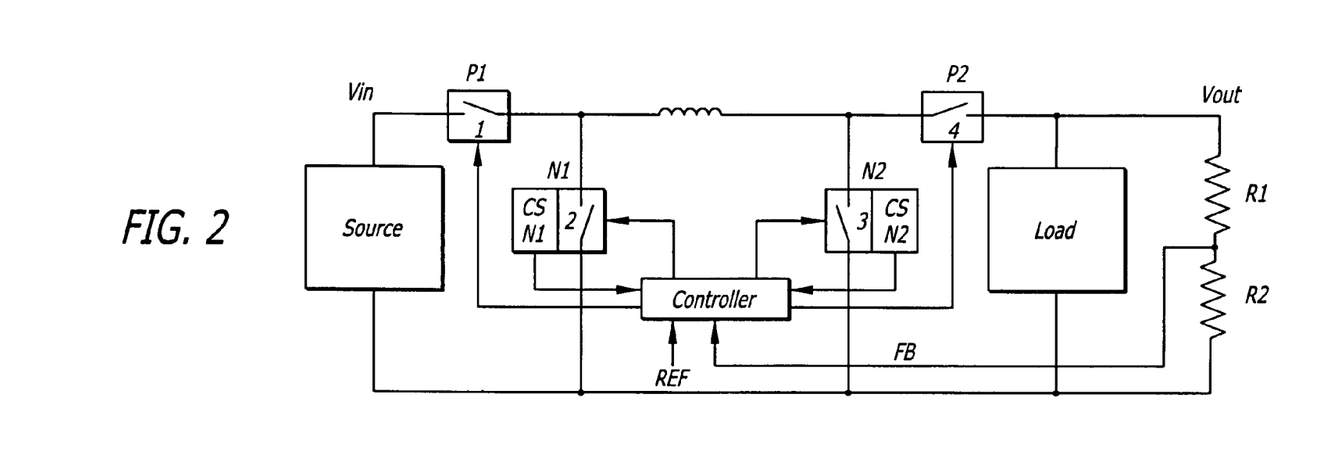
FIG. 2 is a block diagram of the present invention.

A converter in accordance with the present invention is shown in FIG. 2. In such a converter, switches 1 and 4 may be P-channel devices and switches 2 and 3 may be N-channel devices as shown. In that regard, in such converters generally, switches 2 (N1) and 4 (P2) may serve a rectifying function as opposed to a control function, and accordingly, may be realized as conventional diodes, as Schottky diodes or as synchronous rectifiers. Techniques for controlling synchronous rectifiers are well known in the prior art, and accordingly, in order to not obscure the present invention, details of the control of switches 2 (N1) and 4 (P2), if synchronous rectifiers are used, are not repeated herein. Similarly, if on the other hand, diodes such as Schottky diodes are used for switches 2 and 4, the following disclosure will usually ignore the voltage drops across the diodes for circuit analysis purposes. The explanation of the operation of the present invention is still applicable, however, though resulting current waveform slopes will differ somewhat and other minor variations will occur which are non-essential to the understanding of the invention. It should be noted however, that if diodes or synchronous rectifiers prohibiting negative currents are used, then the converters of the present invention will need a minimum load to maintain regulation.

Figure 1:
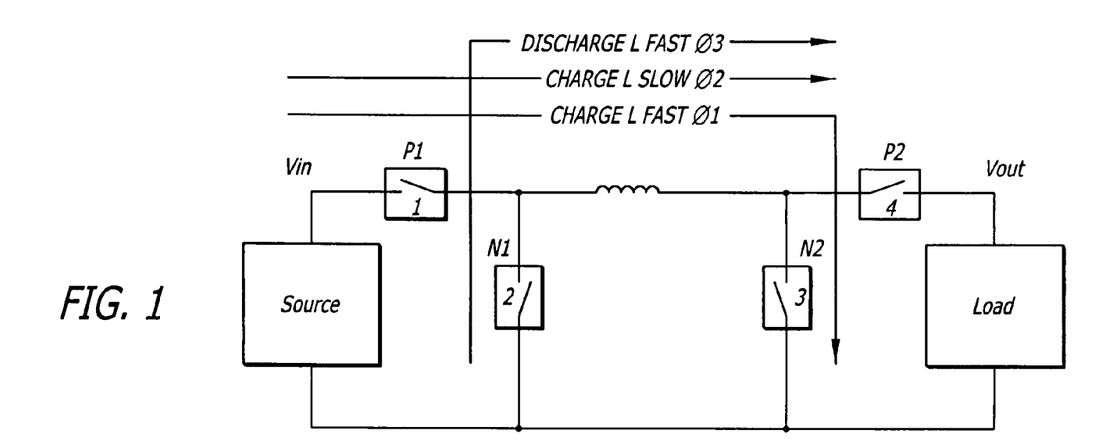
FIG. 1 presents a generic H-bridge circuit that can be used as a buck-boost DC to DC converter.

FIGS. 1 and 2 illustrate the four switches, P1, P2 and N1 and N2, as in a synchronous rectifier embodiment. In normal PWM operation of certain preferred embodiments of the invention, switch N1 is ON when switch P1 is OFF, and switch N1 is OFF when switch P1 is ON, or N1=$\overline{P1}$. Similarly, switch P2 is ON when switch N2 is OFF, and switch P2 is OFF when switch N2 is ON, or P2=$\overline{N2}$. Accordingly, the present invention method will be described with respect to the control of switches P1 and N2, it being recognized that unless noted otherwise, N1=$\overline{P1}$ and P2=$\overline{N2}$. However the present invention is responsive to the current through switches N1 and N2, and accordingly in the preferred embodiment, each of these switches has a current sense circuit CSN1 and CSN2 providing currents to the controller that are proportional (typically much less) than the current through the respective switch. In the preferred embodiment, the current sense circuits are each a form of current mirror, so that the current sense signal to the controller is substantially proportional to the current through the respective switch, even though the voltage across a switch will be a nonlinear function of the current through the switch. Also shown in FIG. 2 as additional inputs to the controller are the feedback FB of the output voltage as divided down by the voltage divider R1 and R2, and a reference voltage Vref.

FIG. 1 illustrates three combinations of switch settings for switches P1 and N2 of FIGS. 1 and 2, referred to herein as Φ1, Φ2 and Φ3, or phases 1, 2 and 3. Φ1 is identified as Charge L Fast, meaning to increase the current through the inductor L at a fast rate. For this current path, switches P1 and N2 are closed or conducting, subsequently indicated by simply P1 N2. Here the charging rate di/dt=$V_{IN}/L$ (neglecting switch voltage drops). Since neither switches N1 nor P2 are in series with this current path, the use of diodes for switches N1 and P2 will not alter this rate of increase in current in inductor L.

Current path Φ2 is identified as a Charge Inductor Slow current path. In this current path, switch P1 is closed and switch N2 is open, denoted hereafter as P1 $\overline{N2}$. In this case, the rate of buildup of current in inductor L is di/dt=

$$\frac{V_{in} - V_{out}}{L}.$$

Note that while this conduction path is labeled Charge L Slow, when $V_{IN}=V_{OUT}$, di/dt through the inductor L will be zero, and when $V_{IN}<V_{OUT}$, di/dt will actually be negative, and in the preferred embodiments, may go negative. If diodes or equivalent synchronous rectifiers are used, the current cannot go negative, being blocked by the turning off of the respective synchronous rectifier or blocked by the respective diode. Also, of course, if switch P2 is in fact a diode, di/dt through the inductor L will be zero when $V_{IN}$ minus the diode voltage drop equals $V_{OUT}$.

The third path, labeled $\Phi_3$, is labeled Discharge L Fast. This current path is characterized by switches P1 and N2 both being open, or $\overline{P1}\ \overline{N2}$. Here the rate of change of current through the inductor L is di/dt=$-V_{OUT}$/L, and in the preferred embodiments, may go negative. Again diodes or equivalent synchronous rectifiers, if used, will prevent reverse current flow. In that regard, if switch P2 is a diode, then di/dt=$-(V_{OUT}$ plus the forward voltage diode drop)/L. In the description to follow, the forward conduction voltage drop of diodes, synchronous rectifiers or even switches N1 and P2 will not be further considered (except for current sense purposes) for purposes of clarity, though their effect may readily be evaluated by one skilled in the art, given the disclosure to follow.

Figures 3A, 3B:
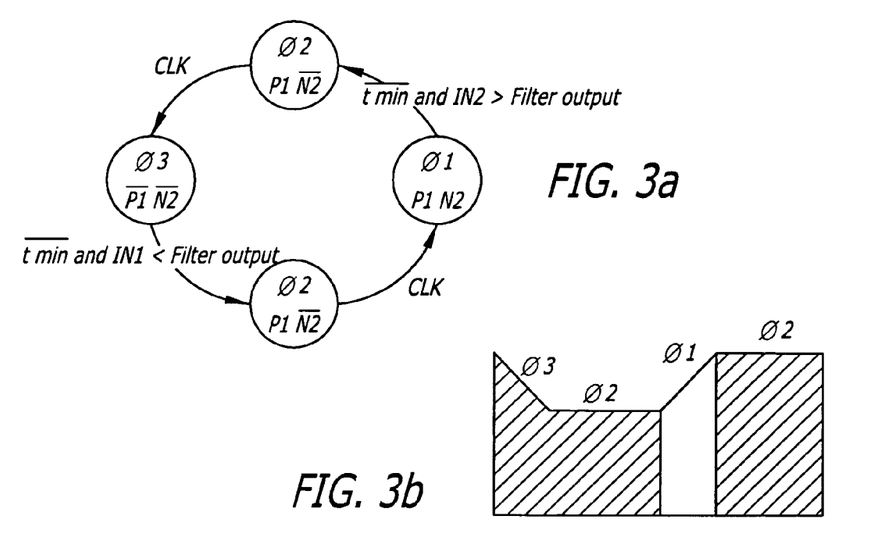
FIG. 3a is a state diagram for one embodiment of the present invention.
FIG. 3b is a diagram illustrating the delivery of charge to the regulator output for one cycle of operation in accordance with the state diagram of FIG. 3a operating with the input voltage equal to the output voltage.

One aspect of the present invention is that the circuit operates in the same mode, independent of whether the input voltage is greater than the output voltage (buck) or the input voltage is less than the output voltage (boost). Three such possible operating modes are illustrated in the state diagrams of FIGS. 3a, 4a and 5a. In FIG. 3a, the controller cycles in the order $\Phi1$, $\Phi2$, $\Phi3$, $\Phi2$, $\Phi1$, $\Phi2$, $\Phi3$, $\Phi2$ . . . . The transitions from $\Phi2$ to $\Phi1$, and $\Phi3$ to $\Phi2$ are clocked, while the transition from $\Phi1$ to $\Phi2$ occurs when the current IN2 is greater than the output of the current control filter (FIG. 6), or after a minimum time if already greater than the current control filter output, and the transition from $\Phi3$ to $\Phi2$ and $\Phi3$ occurs when the current IN1 is less than the output of the current control filter, or after a minimum time if the current IN1 is already less than the output of the current control feeder. In these Figures, "$\overline{tmin}$ and" means that the minimum time has expired and the second condition is or becomes met. In that regard, when currents are referred to as equal, larger than or less than, it is to be understood that such relative measures are usually applicable after scaling. By way of example, the comparators Comp A and Comp B in the current control circuit of FIG. 5 are comparing the current sense outputs of CSN1 and CSN2, which are proportional to the magnitude of, but much less than the actual currents in N1 and N2.

Figures 4A, 4B:
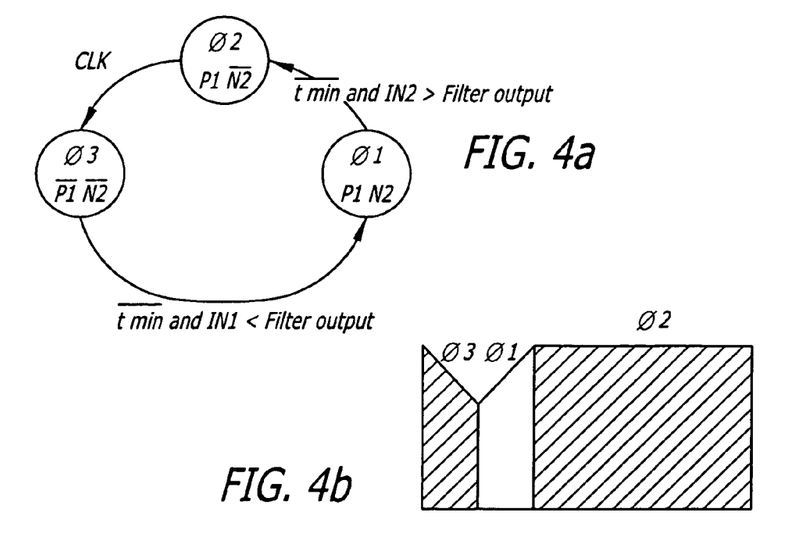
FIG. 4a is a state diagram for another embodiment of the present invention.
FIG. 4b is a diagram illustrating the delivery of charge to the regulator output for one cycle of operation in accordance with the state diagram of FIG. 4a operating with the input voltage equal to the output voltage.
Figure 5A:
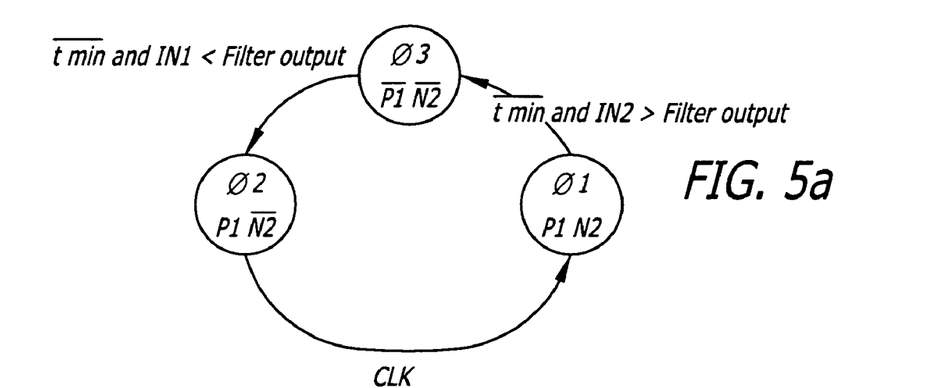
FIG. 5a is a state diagram for still another embodiment of the present invention.

In FIG. 4a, the controller cycles in the order $\Phi1$, $\Phi2$, $\Phi3$, $\Phi1$, $\Phi2$, $\Phi3$, $\Phi1$ . . . and in FIG. 5a, the controller cycles in the order $\Phi3$, $\Phi2$, $\Phi1$, $\Phi3$, $\Phi2$, $\Phi1$ . . . . It will be shown that the control algorithm of FIG. 4a is more efficient in the transfer of regulated power to the output for the same peak currents, and accordingly, that embodiment will be used as the exemplary embodiment for the following detailed description of operation of the invention. In all three cases however, the algorithm used is fixed, independent of whether the output voltage is less than or greater than the supply voltage.

Figure 6:
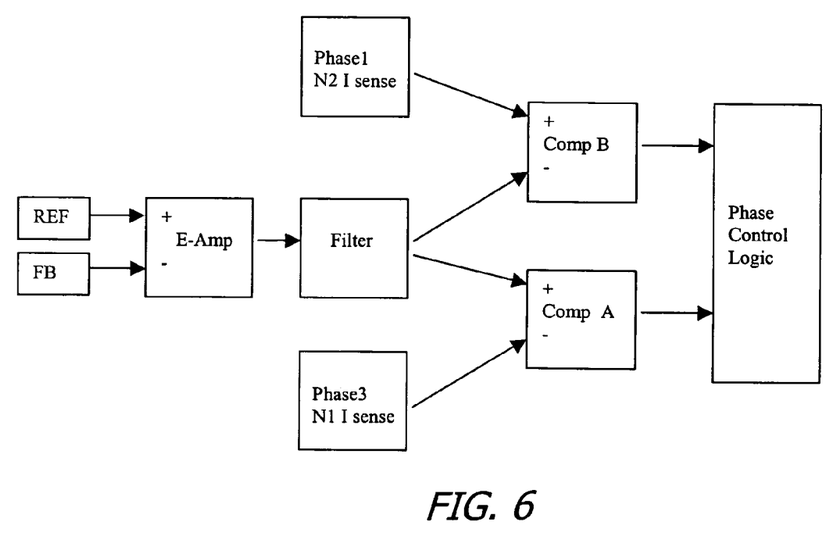
FIG. 6 is a block diagram of the current control used with the preferred embodiments of the present invention.
Figure 7:
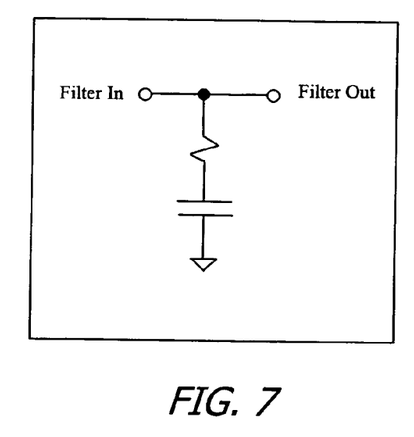
FIG. 7 is a circuit diagram for the filter used in the current control of FIG. 6.

The various embodiments of the present invention use current mode compensation or current control. A block diagram of the current control used with the preferred embodiments of the present invention is shown in FIG. 5. As shown therein, the feedback voltage FB from the voltage divider R1 and R2 of FIG. 2 is compared with the reference voltage REF (FIG. 6) by transconductance amplifier E-AMP, with the current output of the transconductance amplifier E-AMP being filtered by the Filter and then coupled to compensation circuits COMP A and COMP B. These compensation circuits are responsive to the phase 3 ($\Phi3$) current in N1 and the phase 1 ($\Phi1$) current in N2, respectively, with the output of comparators COMP A and COMP B being provided to the phase control logic. The filter circuit for the filter in FIG. 6 is shown in FIG. 7.

Figure 8:
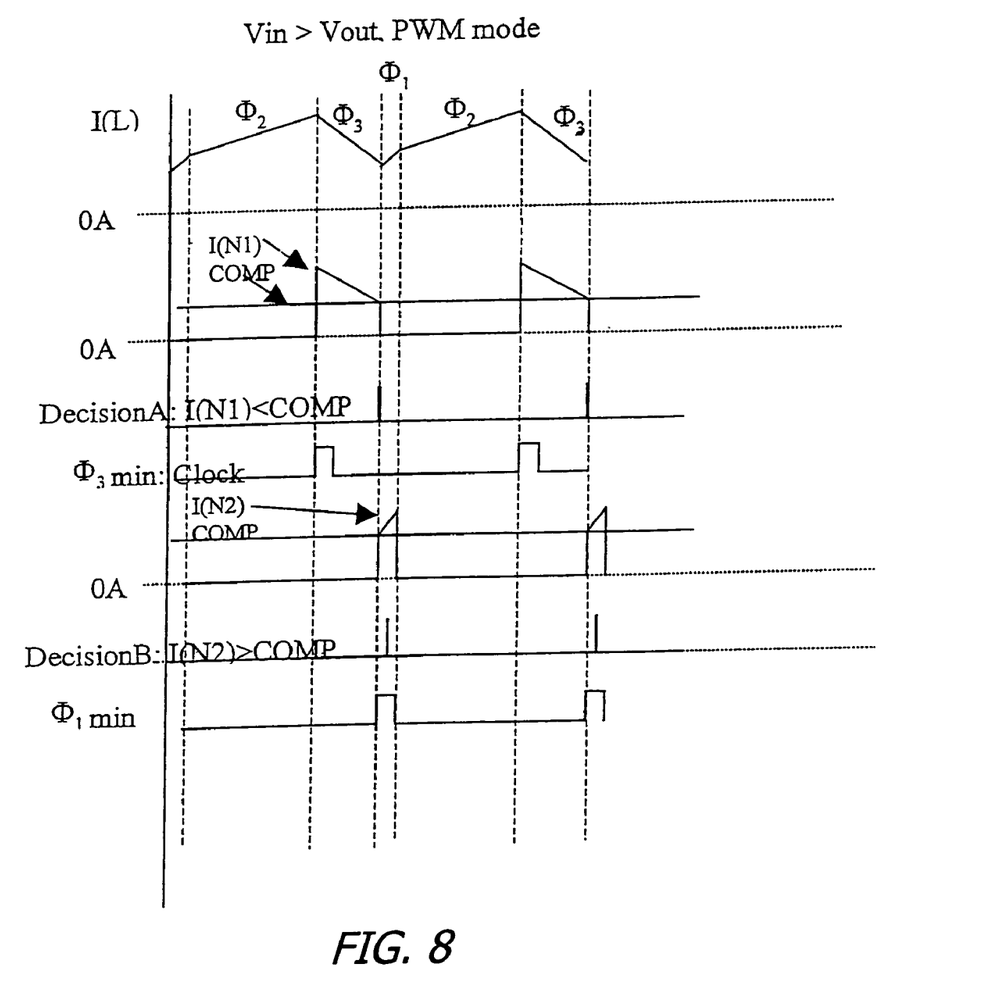
FIG. 8 illustrates the operation of the embodiment of FIG. 4a when the input voltage exceeds the output voltage.
Figure 9:
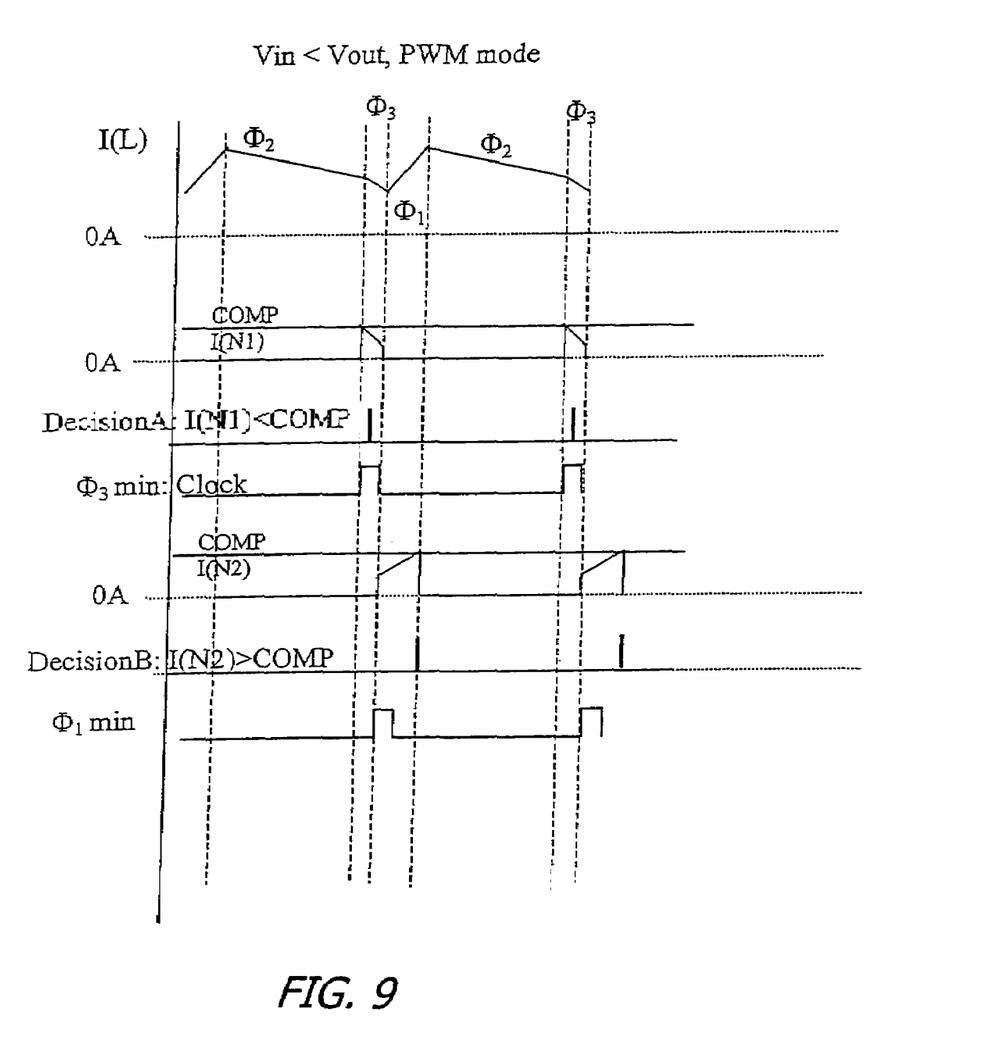
FIG. 9 illustrates the operation of the embodiment of FIG. 4a when the input voltage is less than the output voltage.
Figure 10:
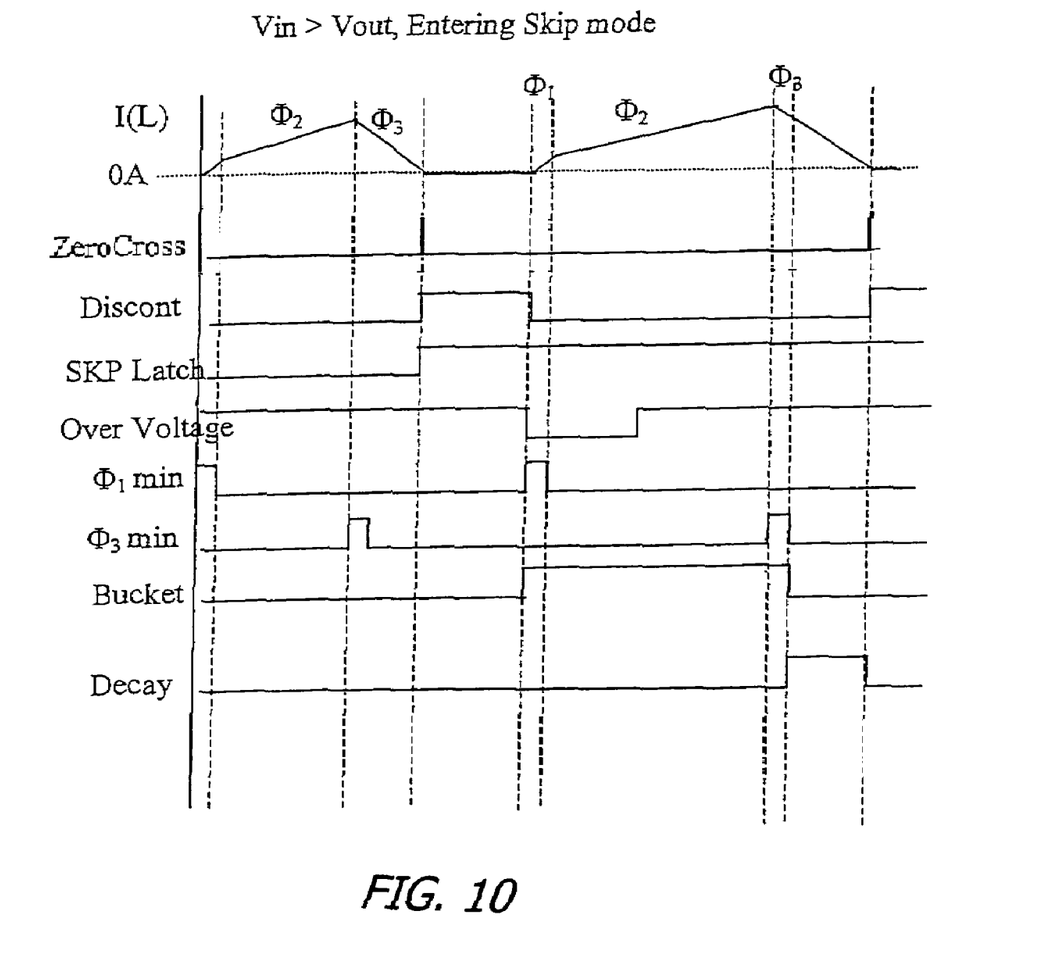
FIG. 10 illustrates the entry of the skip mode.
Figure 11:
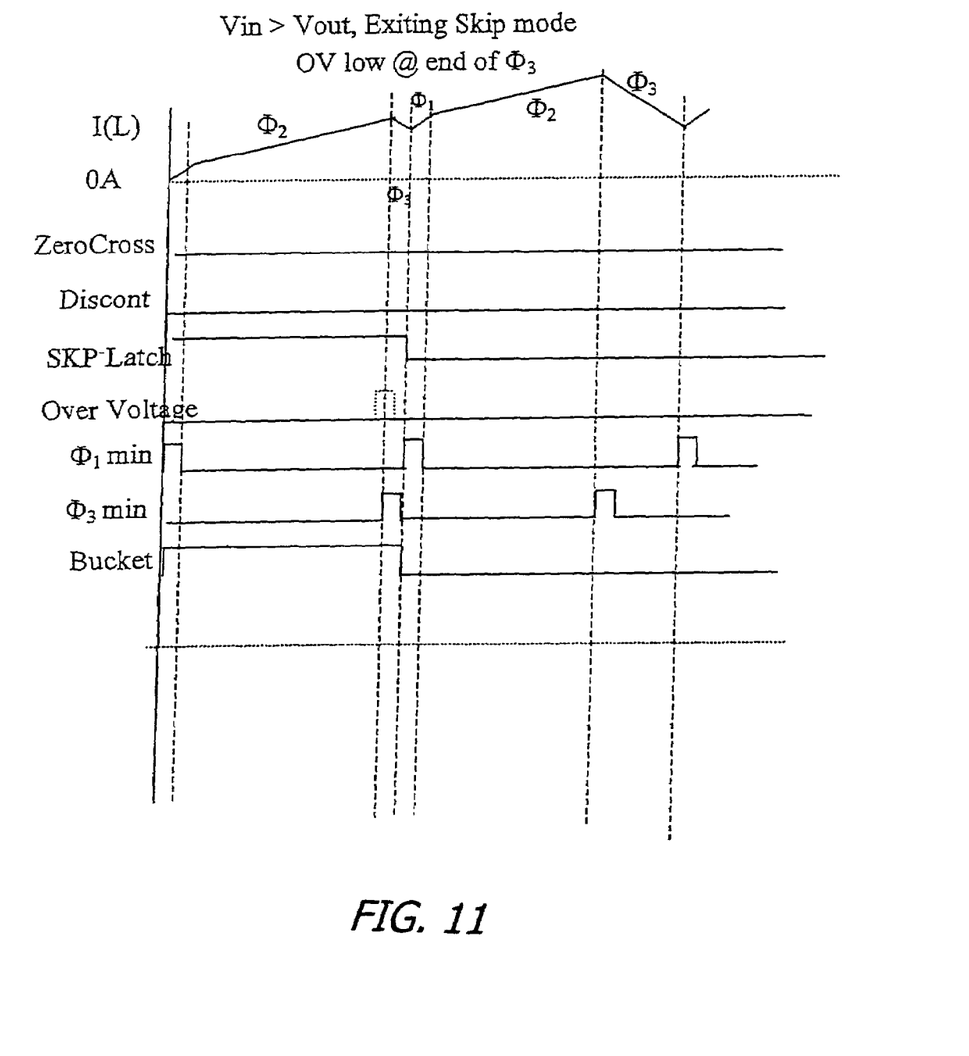
FIG. 11 illustrates the exiting of the skip mode.

The operation of the circuit of FIG. 2 using the state diagram of FIG. 4a is illustrated in FIGS. 8 through 11. FIGS. 8 and 9 illustrate the operation when the input voltage exceeds the output voltage and when the input voltage is less than the output voltage, respectively. FIGS. 10 and 11 illustrate the skip capability of the preferred embodiments. Specifically, the entry of the skip mode is illustrated in FIG. 10 and the exiting of the skip mode is illustrated in FIG. 11. Before describing these Figures in detail, however, it should be noted from FIG. 1 that the current in switch N1 will be non-zero only during $\Phi3$, and the current in switch N2 will be non-zero only during $\Phi1$. Further, as a matter of convenience, in the explanation to follow, currents in the directions indicated for $\Phi1$ and $\Phi3$ are considered positive.

Now referring to FIGS. 4 and 8, operation of the circuit of FIG. 2 in accordance with the embodiment of FIG. 4a will be described. For the operating condition wherein the input voltage exceeds the output voltage of the converter, assume for the moment that the circuit has been running and is in the $\Phi2$ state. In this state, because the input voltage exceeds the output voltage, the current through the inductor L is increasing in the slow charge condition. On the occurrence of the $\Phi3$ clock for a time period referred to herein as tmin, the controller will change to the $\Phi3$ mode by turning off switch P1. This causes conduction through switch N1, with the current through the inductor relatively rapidly decreasing until the current through the inductor is less than the filter current output, changing the output of comparator COMP A, at which time the controller switches to the $\Phi1$ mode by turning on both switches P1 and N2. As shall subsequently be seen, if the current in switch N1 is already less than the filter output current, the switching from $\Phi3$ to $\Phi1$ will occur after the minimum time tmin. In that regard, preferably tmin is selected to be as short as reasonably possible while still allowing the circuit to settle in the new state for accurate sensing purposes.

The $\Phi1$ state will continue until the current through switch N2 exceeds the current through the filter, changing the output of comparator COMP B, or if the current through switch N2 exceeds the current through the filter in less than tmin, then for the duration of the $\Phi1$ pulse (tmin), after which the controller will switch to the $\Phi2$ mode again by turning off switch N2. Again, current in the inductor L increases at the slow charge rate until the next $\Phi3$ clock pulse, at which time the cycle repeats. Thus there are two decision points, decision A when the current in switch N1 falls to less than the filter output current, and decision B when the current in switch N2 increases to exceed the filter output current.

FIG. 9 illustrates the operation of the controller when the input voltage is less than the output voltage. It will be noted that the operation is the same, in the sense that the phases are sequenced the same, namely, $\Phi1$, $\Phi2$, $\Phi3$, $\Phi1$, $\Phi2$, $\Phi3$, $\Phi1$, etc. The main difference is in the wave shapes and time durations of $\Phi3$ and $\Phi1$. In particular, during $\Phi2$ the current through the inductor L actually decreases, so that on switching from $\Phi2$ to $\Phi3$, the current in switch N1 will go to less than the filter output current. Thus the time duration of $\Phi3$ will be held to tmin, with the time duration of the subsequent $\Phi1$ operation exceeding tmin to allow the current in switch N2 to increase to the filter output current.

For light loads on the converter, it is possible for the current in switch N1 to go to zero during $\Phi3$, yet the output voltage of the converter remain above the intended regulation voltage (over voltage), as shown in FIG. 10. For light loads or no load, the feedback FB (FIG. 6) can exceed the reference voltage REF, leading to a negative current out of the Filter. Thus the current in switch N1 will still exceed the output of the Filter when the current in switch N1 goes to zero. This "zero cross" is sensed by the controller, and the clocking oscillator shut down and the circuit otherwise put in a sleep mode (see the Discont signal waveform). In the sleep mode, in the preferred embodiments, switches N1 and N2 are ON and switch P2 is off, blocking current flow back from the load. When the output voltage decreases to less than the regulation voltage, eliminating the over voltage condition, the clock restarts, initiating another Φ1 pulse. However this pulse is for a fixed time, after which the following Φ2 phase remains until the clock changes the phase to Φ3. As illustrated in FIG. 10, the next Φ1, Φ2, Φ3 sequence again drives the output above the reference voltage REF, the controller sensing the over voltage condition part way through the sequence and the Discont signal again shutting the oscillator down at the end of the sequence and putting the circuit in sleep mode until the over voltage no longer exists.

In FIG. 10 for light load or no load conditions, each Φ1, Φ2, Φ3 sequence is initiated from a zero inductor current. When the converter is operating with a low or zero inductor current, the controller is responsive to the output voltage to force initial operation. For instance, if a substantial load is suddenly applied to the converter (see FIG. 11) when in the light load (skip) operation, an over voltage condition will be cleared. If this occurs between Φ1, Φ2, Φ3 sequences, a new sequence will be initiated. When a Φ1, Φ2, Φ3 sequence is initiated from a zero inductor current condition, the Φ1 phase is forced for a predetermined duration, followed by the Φ2 phase until the next clock pulse. When a threshold inductor current is established, control reverts to that explained with respect to FIGS. 8 and 9.

In the case of the output voltage exceeding the input voltage, when an over voltage condition is cleared after a skip mode, operation is similar, though a longer Φ1 and a tmin Φ3 are initially imposed, after which control reverts to that explained with respect to FIGS. 8 and 9. In all cases however, the sequence of operation is the same, namely Φ1, Φ2, Φ3, Φ1, Φ2, Φ3, Φ1 . . . . In that regard, the foregoing represents the preferred method of ending skip, though other methods are also possible.

Figure 12:
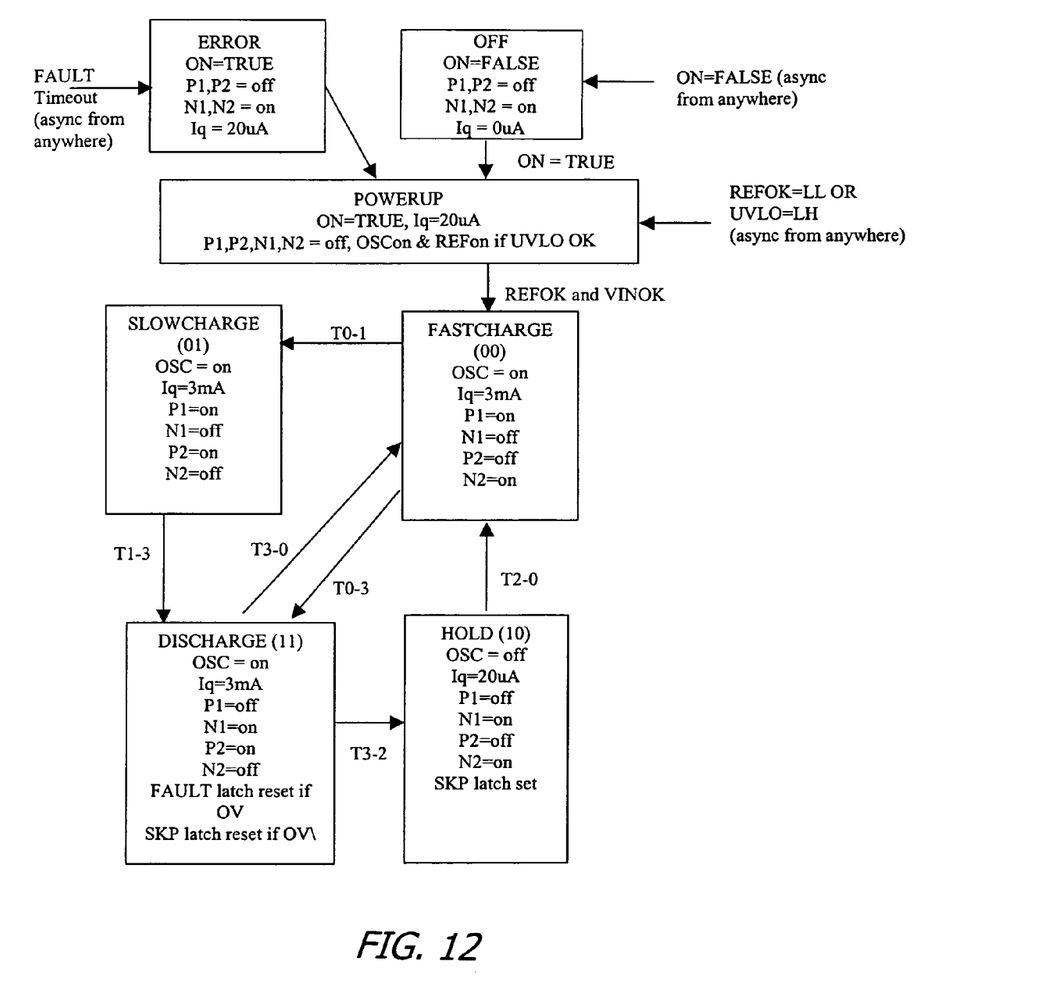

The overall operation of the converter of FIG. 4a is shown by the more detailed state diagram of FIG. 12. In this diagram, an ON signal in the form of a logic high (LH or TRUE) signal causes the converter to power up. Once the bias voltages and reference voltage are stable, the fast charge or phase 1 cycle is initiated. The fast charge will last until the COMP B output switches (FIG. 7), after which the converter switches to the slow charge or phase 2 until the clock signal switches the converter to phase 3. If, on the other hand, that clock signal occurs before the fast charge causes the COMP B output to change state, the clock signal will cause a change directly from phase 1 to phase 3. Phase 3, in turn, will last until COMP A (FIG. 6) changes state, returning the converter to the fast charge or phase 1. If, on the other hand, an over voltage exists at the end of phase 3, a hold is initiated until such time as the over voltage condition is cleared, after which the fast charge or phase 1 is reinitiated. When emerging from a hold condition, the fast charge or phase 1 state is forced for a fixed or predetermined time period, followed by a phase 2 state, also for a predetermined time before the clock initiates the phase 3 state. Exiting the skip or hold mode is the same whether operating with the input voltage exceeding the output voltage or the input voltage being less than the output voltage. However, in the case of the input voltage being less than the output voltage, the fast charge or phase 1 is held for a longer predetermined time before switching to phase 2, which of course would be shortened by the occurrence of the clock pulse. The goal here is to keep the waveshape similar to that of a conventional PWM controller operating under the same conditions.

The converter also preferably has a peak current limit for the switching from fast charge or phase 1 to the slow charge or phase 2. Normally this peak current is set outside the normal operating range of the converter, but in the case of an extraordinary load such as a short circuit, this peak current limit can be attained. In a preferred embodiment, the attainment of that peak current initiates a timer, which in essence gives the system a fixed time to reach regulation, after which the system will be shut down until a new start signal is received. Thus, by way of example, in the case of a short circuit, on power up this peak current will be reached, soon after which the circuit will be shut down again, repeating that sequence on each successive power up signal until being powered up after the short circuit has been corrected. This is merely one example of how such extraordinary loads may be handled without damage to the converter components.

In circuits of the foregoing type there are practical limits regarding how much the input voltage may be below the output voltage. In battery powered systems a particularly low input voltage would mean that the battery is nearing complete discharge and doesn't have significant available energy left. Also, when the input voltage falls way below the output voltage, the converter would have to stay in the fast charge or phase 1 state a large percentage of the time, raising the ratio of peak currents to average output current to the detriment of efficiency, and limiting the average output current of the converter if predetermined peak currents are not to be exceeded. Accordingly, preferred embodiments include input voltage sensing and provide an under voltage lockout (UVLO) to prohibit the power up if the supply voltage is too low. Also preferred embodiments include a soft start capability by limiting the current in switch P1 to a start up ramp, in the preferred embodiment the ramp being comprised of smaller steps up to the operating current levels.

Having now described the operation of the state diagram of FIG. 4a, that of FIGS. 3a and 5a will become apparent. In that regard, the soft start, the under voltage lockout, the entering and exiting of the sleep mode when an over voltage condition exists after the inductor current goes to zero during phase 3 and the automatic shutdown if the regulator does not reach regulation a predetermined time after an inductor current limit is reached may be the same for all three embodiments. Also, while clocking between specific phases is shown, in some cases clocking between other phases (other decision points) can be used instead.

Figure 5B:
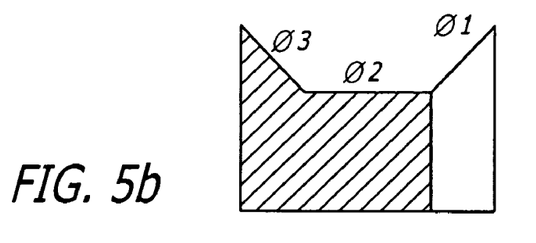
FIG. 5b is a diagram illustrating the delivery of charge to the regulator output for one cycle of operation in accordance with the state diagram of FIG. 5a operating with the input voltage equal to the output voltage.

With respect to a comparison of the three methods of operation, FIGS. 3b, 4b and 5b give comparisons for Vout=Vin. This is a convenient comparison point, as the present invention frequently operates around this condition. In all three cases, of course, the current during phase 2 is constant. However, because the method of FIG. 3a goes from phase 3 to phase 2, the current during one of the phase 2 operations is less than during the single phase 2 of the method of FIG. 4a. With the same inductance, frequency, peak current and gate drives, the embodiment of FIG. 4a delivers approximately 16% greater average current to a load. In the embodiment of FIG. 5a, the converter goes directly from phase 1 to phase 3, eliminating the second phase 2 operation, a highly efficient phase for delivery of current to a load, of the embodiment of FIGS. 3a and 3b. Thus with the same inductance, frequency, peak current and gate drives, the embodiment of FIGS. 5a and 5b delivers even less average current to a load than the embodiment of FIGS. 3a and 3b. However it still preserves certain advantages of the present invention, including but not limited to operation with an input voltage both above and below the output voltage without a mode change.

Thus the present invention has no mode changes, yet provides good transient response, has low current ripple over the entire Vin/Vout range and provides low component stress over the entire Vin/Vout using a simple control algorithm. While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A step-up/step-down switching regulator control method, the regulator having an inductor with first and second leads, a first switch for controllably coupling the first lead to a source of power, a first device between the first lead and a circuit ground, for conducting current from the circuit ground to the first lead, a second switch for controllably coupling the second lead to the circuit ground, and a second device between the second lead and a regulator output for conducting current from the second lead to the regulator output, the method comprising:

operating the switches in a sequence of phases when the source of power has a voltage exceeding the regulator output and in the same sequence of phases when the source of power has a voltage less than the regulator output;

the phases being;
phase 1 with the first and second switches closed;
phase 2 with the first switch closed and the second switch open;
phase 3 with both switches open.

2. The method of claim 1 wherein the first and second devices are third and fourth switches, respectively, the third switch being on when the first switch is off and being off when the first switch is on, and the fourth switch being on when the second switch is off and off when the second switch is on.

3. The method of claim 1 wherein the first device comprises a first diode for conducting current from the circuit ground to the first lead, and the second device comprises a second diode for conducting current from the second lead to the regulator output.

4. The method of claim 1 wherein current mode compensation is used.

5. The method of claim 4 wherein the sequence of phases is phase 1, phase 2, phase 3, phase 2, then back to phase 1 to repeat the sequence.

6. The method of claim 5 wherein the transition from phase 2 to phase 3 and the transition from phase 2 to phase 1 are clocked transitions.

7. The method of claim 6 wherein the transition from phase 1 to phase 2 occurs when the current through the second switch goes above an output of a current mode filter, or after a minimum time if the current through the second switch is or goes above the output of the current mode filter before the minimum time, and the transition from phase 3 to phase 2 occurs when the current through the first device goes below an output of a current mode filter, or after a minimum time if the current through the first device is or goes below the output of the current mode filter before the minimum time.

8. The method of claim 4 wherein the sequence of phases is phase 1, phase 3, phase 2, then back to phase 1 to repeat the sequence.

9. The method of claim 8 wherein the transition from phase 2 to phase 1 is a clocked transition.

10. The method of claim 9 wherein the transition from phase 1 to phase 3 occurs when the current through the second switch goes above an output of a current mode filter, or after a minimum time if the current through the second switch is or goes above the output of the current mode filter before the minimum time, and the transition from phase 3 to phase 2 occurs when the current through the first device goes below an output of a current mode filter, or after a minimum time if the current through the first device is or goes below the output of the current mode filter before the minimum time.

11. The method of claim 4 wherein the sequence of phases is phase 1, phase 2, phase 3, then back to phase 1 to repeat the sequence.

12. The method of claim 11 wherein the transition from phase 2 to phase 3 is a clocked transition.

13. The method of claim 12 wherein the transition from phase 1 to phase 2 occurs when the current through the second switch goes above an output of a current mode filter, or after a minimum time if the current through the second switch is or goes above the output of the current mode filter before the minimum time, and the transition from phase 3 to phase 1 occurs when the current through the first device goes below an output of a current mode filter, or after a minimum time if the current through the first device is or goes below the output of the current mode filter before the minimum time.

14. The method of claim 1 wherein if the current in the inductor goes to zero during phase 3 and the regulator output is above regulation, the regulator is put in a sleep mode until the regulator output falls below regulation.

15. The method of claim 14 wherein the regulator output falls below regulation while in the sleep mode, phase 1 operation is initiated for a predetermined length of time before changing to phase 2.

16. The method of claim 1 wherein the method further comprises shutting down the regulator if the regulator output fails to reach a regulated voltage within a predetermined time after a current limit for the current through the inductor is reached.

17. The method of claim 16 further comprised of preventing the operation of the regulator if the voltage of the source of power is less than a predetermined voltage.

18. A step-up/step-down switching regulator control method comprising:

providing an inductor with first and second leads;
providing a first switch for controllably coupling the first lead to a source of power;
providing a first device between the first lead and a circuit ground for conducting current from the circuit ground to the first lead;
providing a second switch for controllably coupling the second lead to the circuit ground;
providing a second device between the second lead and a regulator output for conducting current from the second lead to the regulator output;
operating the switches in a sequence of phases when the source of power has a voltage exceeding the regulator output and in the same sequence of phases when the source of power has a voltage less than the regulator output;

the phases being;
    phase 1 with the first and second switches closed;
    phase 2 with the first switch closed and the second switch open;
    phase 3 with both switches open.

19. The method of claim 18 wherein the first and second devices are third and fourth switches, respectively, the third switch being on when the first switch is off and being off when the first switch is on, and the fourth switch being on when the second switch is off and off when the second switch is on.

20. The method of claim 18 wherein the first device comprises a first diode for conducting current from the circuit ground to the first lead, and the second device comprises a second diode for conducting current from the second lead to the regulator output.

21. The method of claim 18 wherein current mode compensation is used.

22. The method of claim 21 wherein the sequence of phases is phase 1, phase 2, phase 3, phase 2, then back to phase 1 to repeat the sequence.

23. The method of claim 22 wherein the transition from phase 2 to phase 3 and the transition from phase 2 to phase 1 are clocked transitions.

24. The method of claim 23 wherein the transition from phase 1 to phase 2 occurs when the current through the second switch goes above an output of a current mode filter, or after a minimum time if the current through the second switch is or goes above the output of the current mode filter before the minimum time, and the transition from phase 3 to phase 2 occurs when the current through the first device goes below an output of a current mode filter, or after a minimum time if the current through the first device is or goes below the output of the current mode filter before the minimum time.

25. The method of claim 21 wherein the sequence of phases is phase 1, phase 3, phase 2, then back to phase 1 to repeat the sequence.

26. The method of claim 25 wherein the transition from phase 2 to phase 1 is a clocked transition.

27. The method of claim 26 wherein the transition from phase 1 to phase 3 occurs when the current through the second switch goes above an output of a current mode filter, or after a minimum time if the current through the second switch is or goes above the output of the current mode filter before the minimum time, and the transition from phase 3 to phase 2 occurs when the current through the first device goes below an output of a current mode filter, or after a minimum time if the current through the first device is or goes below the output of the current mode filter before the minimum time.

28. The method of claim 21 wherein the sequence of phases is phase 1, phase 2, phase 3, then back to phase 1 to repeat the sequence.

29. The method of claim 28 wherein the transition from phase 2 to phase 3 is a clocked transition.

30. The method of claim 29 wherein the transition from phase 1 to phase 2 occurs when the current through the second switch goes above an output of a current mode filter, or after a minimum time if the current through the second switch is or goes above the output of the current mode filter before the minimum time, and the transition from phase 3 to phase 1 occurs when the current through the first device goes below an output of a current mode filter, or after a minimum time if the current through the first device is or goes below the output of the current mode filter before the minimum time.

31. The method of claim 18 wherein if the current in the inductor goes to zero during phase 3 and the regulator output is above regulation, the regulator is put in a sleep mode until the regulator output fails below regulation.

32. The method of claim 31 wherein the regulator output falls below regulation while in the sleep mode, phase 1 operation is initiated for a predetermined length of time before changing to phase 2.

33. The method of claim 18 wherein the method further comprises shutting down the regulator if the regulator output fails to reach a regulated voltage within a predetermined time after a current limit for the current through the inductor is reached.

34. The method of claim 33 further comprised of preventing the operation of the regulator if the voltage of the source of power is less than a predetermined voltage.

* * * * *